(12) United States Patent
Duan et al.

(10) Patent No.: US 8,139,662 B2
(45) Date of Patent: Mar. 20, 2012

(54) MOBILE STATION DEVICE

(75) Inventors: Jinsong Duan, Kanagawa (JP); Mitsuru Uesugi, Kanagawa (JP); Keisuke Ebiko, Kanagawa (JP); Keiji Takakusaki, Kanagawa (JP); Atsushi Sumasu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 350 days.

(21) Appl. No.: 11/997,710

(22) PCT Filed: Aug. 4, 2005

(86) PCT No.: PCT/JP2005/014336
§ 371 (c)(1),
(2), (4) Date: Feb. 5, 2009

(87) PCT Pub. No.: WO2007/015305
PCT Pub. Date: Feb. 8, 2007

(65) Prior Publication Data
US 2010/0195707 A1 Aug. 5, 2010

(51) Int. Cl.
*H04K 1/10* (2006.01)
(52) U.S. Cl. ......... 375/260; 375/299; 375/347; 375/349
(58) Field of Classification Search .................. 375/260, 375/299, 347, 349
See application file for complete search history.

(56) References Cited

U.S. PATENT DOCUMENTS

| | | | | |
|---|---|---|---|---|
| 7,272,190 | B2* | 9/2007 | Blankenship et al. | 375/260 |
| 7,457,588 | B2* | 11/2008 | Love et al. | 455/67.11 |
| 7,542,514 | B2* | 6/2009 | Song et al. | 375/260 |
| 2005/0025039 | A1* | 2/2005 | Hwang et al. | 370/206 |
| 2005/0025254 | A1* | 2/2005 | Awad et al. | 375/295 |
| 2005/0128993 | A1* | 6/2005 | Yu et al. | 370/342 |
| 2005/0201295 | A1* | 9/2005 | Kim et al. | 370/241 |
| 2005/0201474 | A1* | 9/2005 | Cho et al. | 375/260 |
| 2006/0089102 | A1 | 4/2006 | Nishio | |
| 2006/0133402 | A1 | 6/2006 | Dottling | |
| 2006/0146920 | A1* | 7/2006 | Suh et al. | 375/221 |

FOREIGN PATENT DOCUMENTS

| | | |
|---|---|---|
| JP | 2003-169063 | 6/2003 |
| JP | 2004-104293 | 4/2004 |
| JP | 2004-208234 | 7/2004 |

(Continued)

OTHER PUBLICATIONS

Notice of the Reasons for Rejection dated Jun. 15, 2010.

(Continued)

*Primary Examiner* — Kabir A Timory
(74) *Attorney, Agent, or Firm* — Dickinson Wright PLLC

(57) ABSTRACT

A mobile terminal device for performing multi-carrier communication with a base station device can improve communication quality while reducing the data amount without lowering accuracy of feedback information. In the mobile station device (100), a reception level measuring unit (135) measuring SINR as a reception level for each chunk formed by a plurality of sub-carriers according to a known signal; a control information transmission control unit (160) transmits feedback information (CQI information) based on the communication quality of each chunk to a base station device (200); a relative value calculation unit (150) calculates a relative value of MCS corresponding to the reception level between adjacent chunks from the reception level of each chunk; and a CQI information generation unit (155) generates feedback information (CQI information) from an absolute value of MCS corresponding to the reception level of the reference chunk and a relative value of MCS corresponding to the reception level between the adjacent chunks.

5 Claims, 18 Drawing Sheets

FOREIGN PATENT DOCUMENTS

| | | |
|---|---|---|
| JP | 2004-532586 | 10/2004 |
| JP | 2005-159577 | 6/2005 |
| WO | 02/093757 | 11/2002 |
| WO | 2004/028065 | 4/2004 |
| WO | 2004/030263 | 4/2004 |
| WO | 2004/073245 | 8/2004 |

OTHER PUBLICATIONS

International Search Report dated Nov. 15, 2005.

T. Baba, et al., "OFDM Tekio Hencho System ni Oite Career Hole Siegyo o Michita Block Seigyogata Multi-level Soshin Denryoku Siegyo Hoshiki ni Kansuru Kento," IEICE Technical Report, vol. 103, No. 553, Jan. 9, 2004, pp. 11-16.

J. Tomoto, et al., "Tekio Hencho a Mochiita Burst Mode OFDM Tsushin Hoshiki ni Kansuru Kento," IEICE Technical Report, vol. 101, No. 280, Aug. 31, 2001, pp. 51-57.

3GPP TSG RAN WG1 Ad Hoc on LTE, "Physical Channels and Multiplexing in Evolved UTRA Downlink," Jun. 20-21, 2005, pp. 1-24.

Notice of Reasons for Rejection dated Sep. 14, 2010.

Japanese Office Action dated May 31, 2011.

* cited by examiner

MOBILE STATION DEVICE

TECHNICAL BACKGROUND

The present invention relates to a mobile station apparatus. More particularly, the present invention relates to a mobile station apparatus that performs multicarrier communication with a base station apparatus.

BACKGROUND ART

In OFDM transmission, there are cases where communication quality varies between subcarriers due the influence of frequency selective fading (see FIG. 1). Further, in downlink OFDM transmission, channel states differ between terminals (OE), and so, by making the UEs report communication quality, a base station (Node-3) can select only subcarriers having good communication quality and allocate transmission data per UE. This allocation method is referred to as "frequency scheduling."

Generally, in order to perform frequency scheduling, it is necessary for the terminals to measure received quality based on a known pilot signal transmitted from the base station and report communication quality information (CQI) based on the measurement result to the base station. However, when the number of subcarriers forming an OFDM signal is large and CQI is reported for all subcarriers, the amount of CQI reporting becomes enormous, and a problem arises that uplink radio resources are wasted.

Therefore, conventionally, various schemes for reducing the amount of CQI reporting have been devised. For example, Non-Patent Document 1 discloses using a relative value of received quality in the time and frequency domain as shown in FIG. 1 and reducing the amount of CQI reporting. To be more specific, as shown in FIG. 2, for chunk #1, an absolute CQI value is reported. For other chunks, relative values with respect to the CQI for chunk #1 (CQI relative values) are reported. By this means, it is possible to reduce the amount of data transmission for reporting, compared to the case of reporting absolute CQI values for all chunks. Here, "chunk" generally refers to a bundle of subcarriers consecutive in the frequency domain. Particularly, in scheduling at the base station apparatus, "chunk" refers to a two-dimensional (time domain and frequency domain) bundle including a predetermined number of subcarriers and a predetermined number of TTIs, and refers to a minimum unit allocated to one terminal apparatus.

Non-Patent Document 1: NTT DOCOMO 3GPP R1-050590

DISCLOSURE OF INVENTION

Problems to be Solved by the Invention

In conventional OFDM transmission, there is the following problem. That is, primarily, CQI relative values are always calculated using CQI of one chunk at an edge in the frequency domain as a reference, and therefore, under a circumstance where the number of bits prepared for reporting CQI relative values is limited, frequency selective fading patterns of substantial fluctuations cannot be accurately represented. For example, as shown in FIG. 3, when CQI relative values are reported using chunk 1 as a reference and the number of bits prepared for showing CQI relative values is two, the CQI relative values for chunk 5 and chunk 6 having CQI greatly different from the CQI for chunk 1, cannot be shown with the prepared bits. That is, when the selection of a chunk is not appropriate for the reason that the chunk selected as a reference is greatly different from the CQI for other chunks, the accuracy of the CQI for other chunks deteriorates. Therefore, a problem arises that communication quality deteriorates due to deterioration of the accuracy of CQI reported values.

It is therefore an object of the present invention to provide a mobile station apparatus that performs multicarrier communication with a base station apparatus, and that makes it possible to reduce the data amount for feedback and improve communication quality without deteriorating the accuracy of feedback information.

Means for Solving the Problem

The mobile station apparatus of the present invention performs multicarrier communication with a base station apparatus and adopts a configuration including: a communication quality measuring section that measures communication quality of each chunk comprised of a plurality of subcarriers, based on a known signal; a transmitting section that transmits feedback information based on the communication quality of each chunk to the base station apparatus; a relative value calculating section that calculates a relative value of communication quality for adjacent chunks from the communication quality of each chunk; and a feedback information generating section that generates the feedback information from the absolute value of the reference chunk and the absolute value of the communication quality for the adjacent chunks.

Advantageous Effect of the Invention

According to the present invention, it is possible to provide a mobile station apparatus that performs multicarrier communication with a base station apparatus, and that makes it possible to reduce the data amount for feedback and improve communication quality without deteriorating the accuracy of feedback information.

BEST MODE FOR CARRYING OUT THE INVENTION

Figure 1:
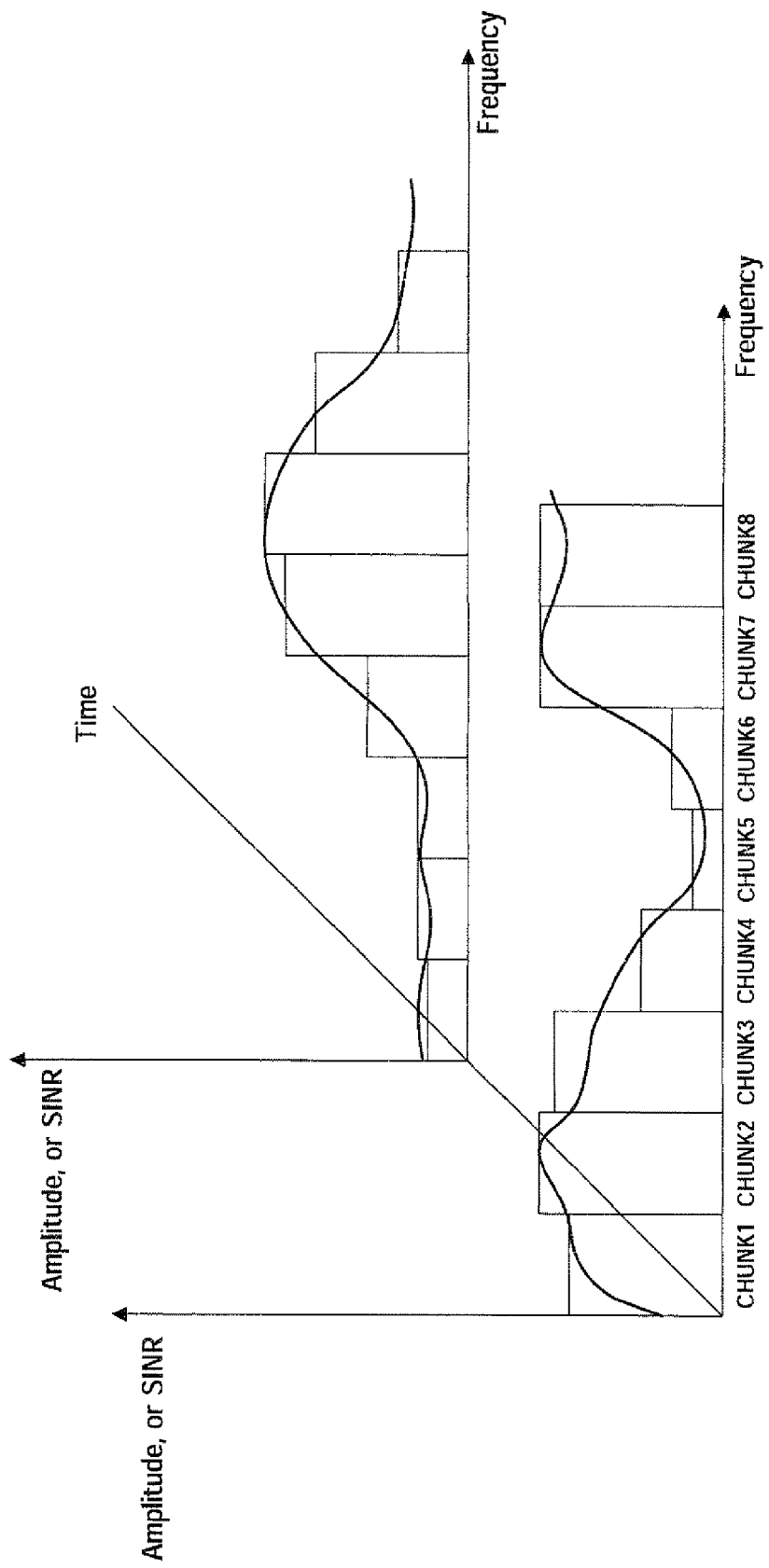
FIG. 1 illustrates a state where communication quality of subcarriers fluctuates due to the influence of frequency selective fading.
Figure 2:
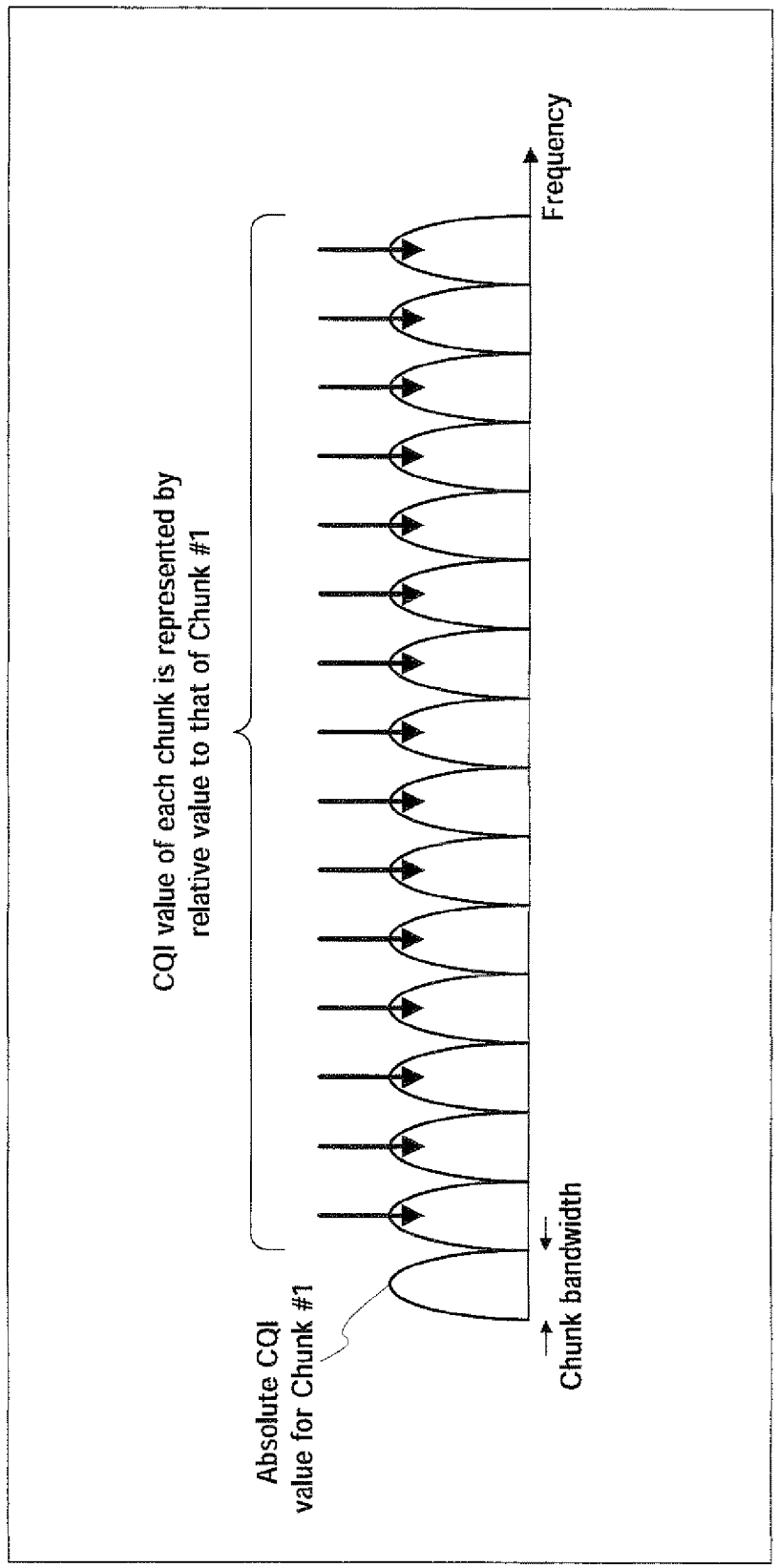
FIG. 2 illustrates a method for generating feedback information of a conventional mobile station apparatus.
Figure 3:
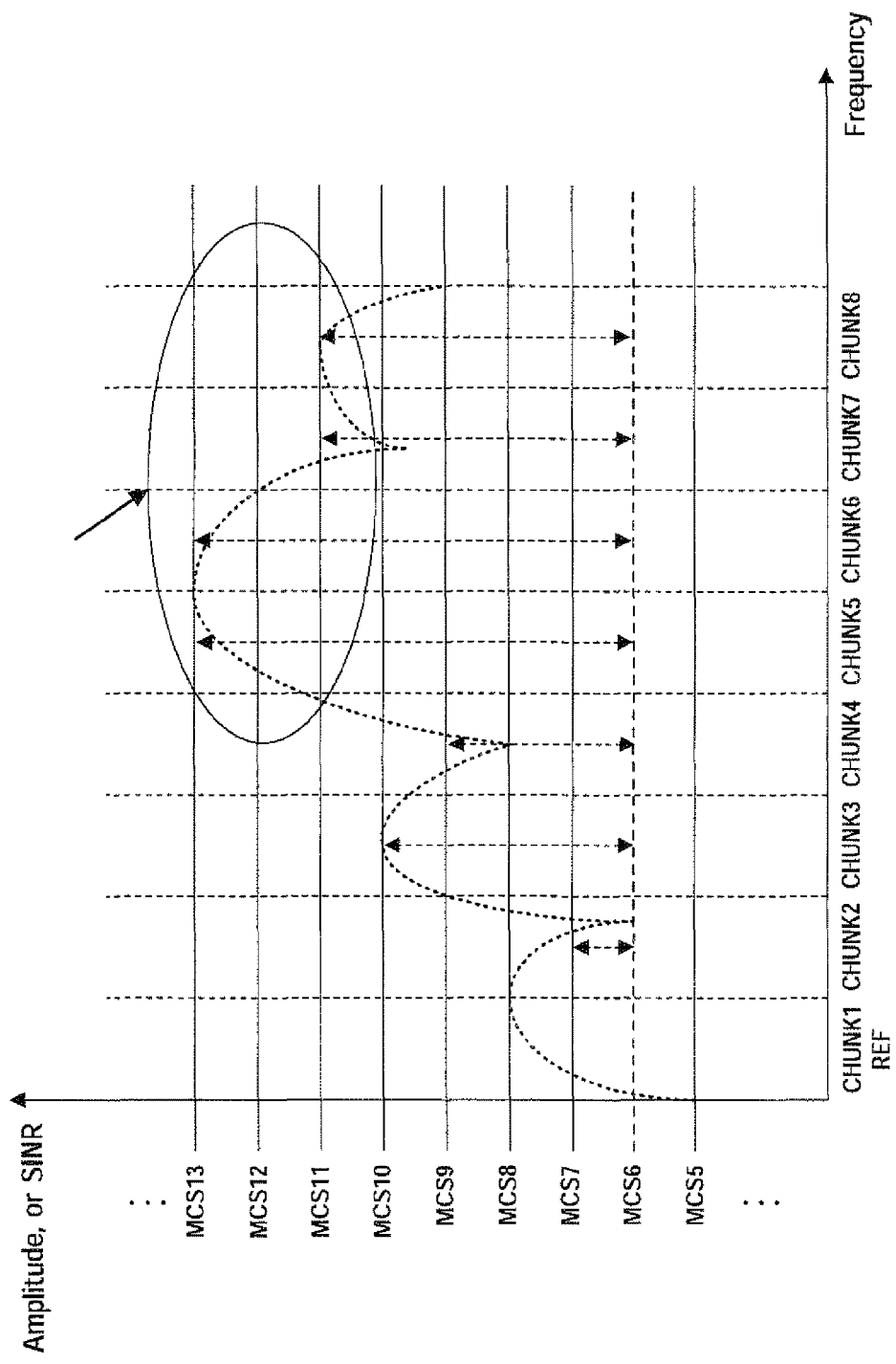
FIG. 3 illustrates a method for generating feedback information of the conventional mobile station apparatus.

Embodiments of the present invention will be described in detail below with reference to the accompanying drawings. In the embodiments, the same components will be assigned the same reference numerals, and description thereof will be omitted.

Embodiment 1

Figure 4:
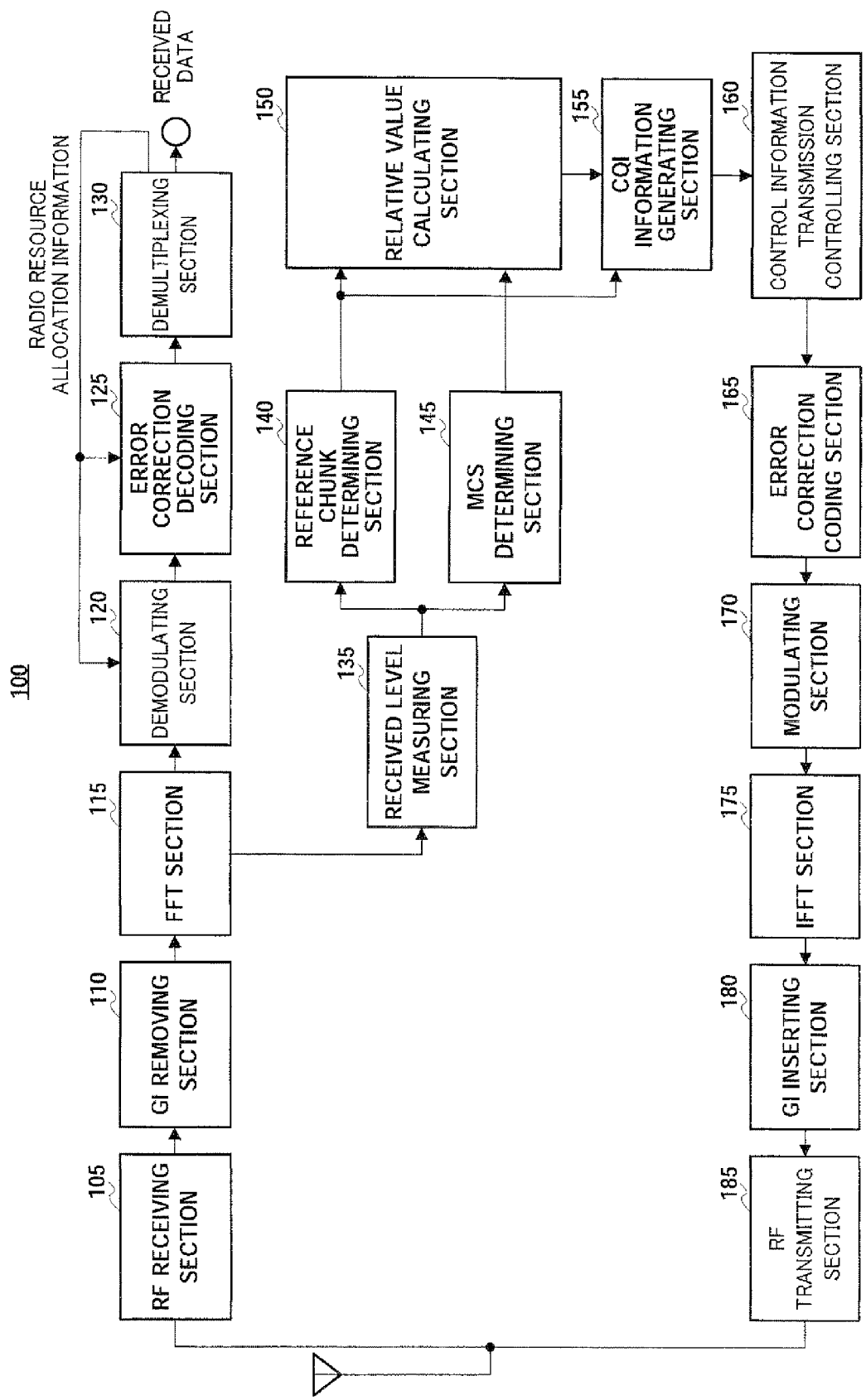
FIG. 4 is a block diagram showing a configuration of a mobile station apparatus according to Embodiment 1 of the present invention.

As shown in FIG. 4, mobile station 100 of Embodiment 1 has RE receiving section 105, GI removing section 110, FFT section 115, demodulating section 120, error correction decoding section 125, demultiplexing section 130, received level measuring section 135, reference chunk determining section 140, MOS determining section 145, relative value calculating section 150, CQI information generating section 155, control information transmission controlling section 160, error correction coding section 165, modulating section 170, IFFT section 175, GI inserting section 180 and RF transmitting section 185.

RF receiving section 105 receives a signal transmitted from base station apparatus 200 (described later) and performs RF processing such as down-conversion.

GI removing section 110 removes guard intervals from the received signal subjected to RF processing and outputs the result to FFT section 115.

FFT section 115 receives as input from GI removing section 110 the received signal from which the guard intervals are removed and performs FFT processing on this input signal. FFT section 115 outputs the received signal subjected to FFT processing to received level measuring section 135 and demodulating section 120.

Received level measuring section 135 measures a received level of each chunk using a pilot signal included in the received signal subjected to FFT processing. Here, "chunk" refers to a group of subcarriers consecutive in the frequency domain, a group of non-consecutive subcarriers, or a range that is formed with a plurality of subcarriers and TTI and that is specified by time and frequency. Chunk is used as a minimum unit of resources allocated to one mobile station (UE).

Reference chunk determining section 140 determines a chunk (reference chunk) for which the absolute value of the modulation and coding scheme (MCS) is reported to base station apparatus 200 (described later) as CQI information, according to predetermined principles based on the received signal level (for example, SINR) measured at received level measuring section 135. Predetermined principles include, for example, principles of using a predetermined chunk as the reference chunk and principles of using the chunk having the highest received signal level as the reference chunk in Embodiment 1, it is assumed that the chunk having the highest received signal level is determined as the reference chunk. By using the chunk having the highest received signal level as the reference chunk, the chunk having the best channel quality is used as the reference chunk, so that it is possible to increase the accuracy of CQI information generated based on this reference chunk. Particularly, a relative value is used as a difference (relative value), and therefore, if the difference step width does not match the fluctuation width of the channel, the accuracy of CQI may decrease in accordance with the distance from the reference chunk. Generally, when frequency scheduling is performed, resources are allocated to chunks having good CQI, and information of the chunks having good CQI is regarded as important. Therefore, regarding CQI information, it is particularly preferable to increase the accuracy of information of the chunks having good channel quality. Further, by using the chunk having a high received signal level as a reference, the most reliable value is used as the reference, and therefore reliability of relative values of other chunks calculated based on the received signal level of this reference chunk increases.

MCS determining section 145 determines the MCS corresponding to the received level measured at received level measuring section 135 per chunk.

Relative value calculating section 150 calculates relative values of MCS's for adjacent chunks based on the reference chunk determined at reference chunk determining section 140 and the MCS of each chunk determined at MCS determining section 145.

To be more specific, first, relative value calculating section 150 temporarily stores the absolute value of the MCS for the reference chunk, and calculates and temporarily stores the relative values of MCS's for adjacent chunks for other chunks.

Figure 5:
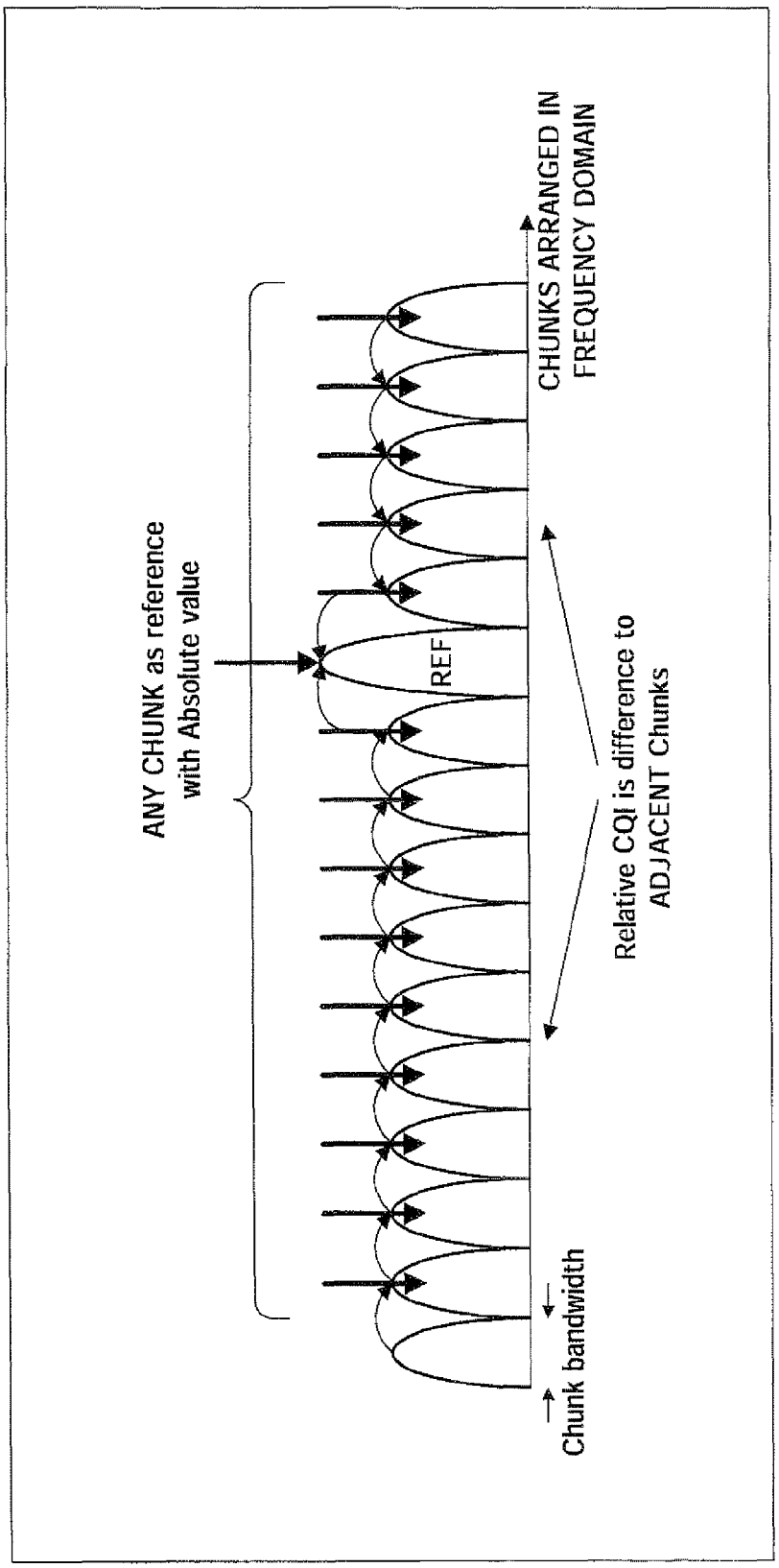
FIG. 5 illustrates a method for generating feedback information of the mobile station apparatus in FIG. 4.
Figure 6:
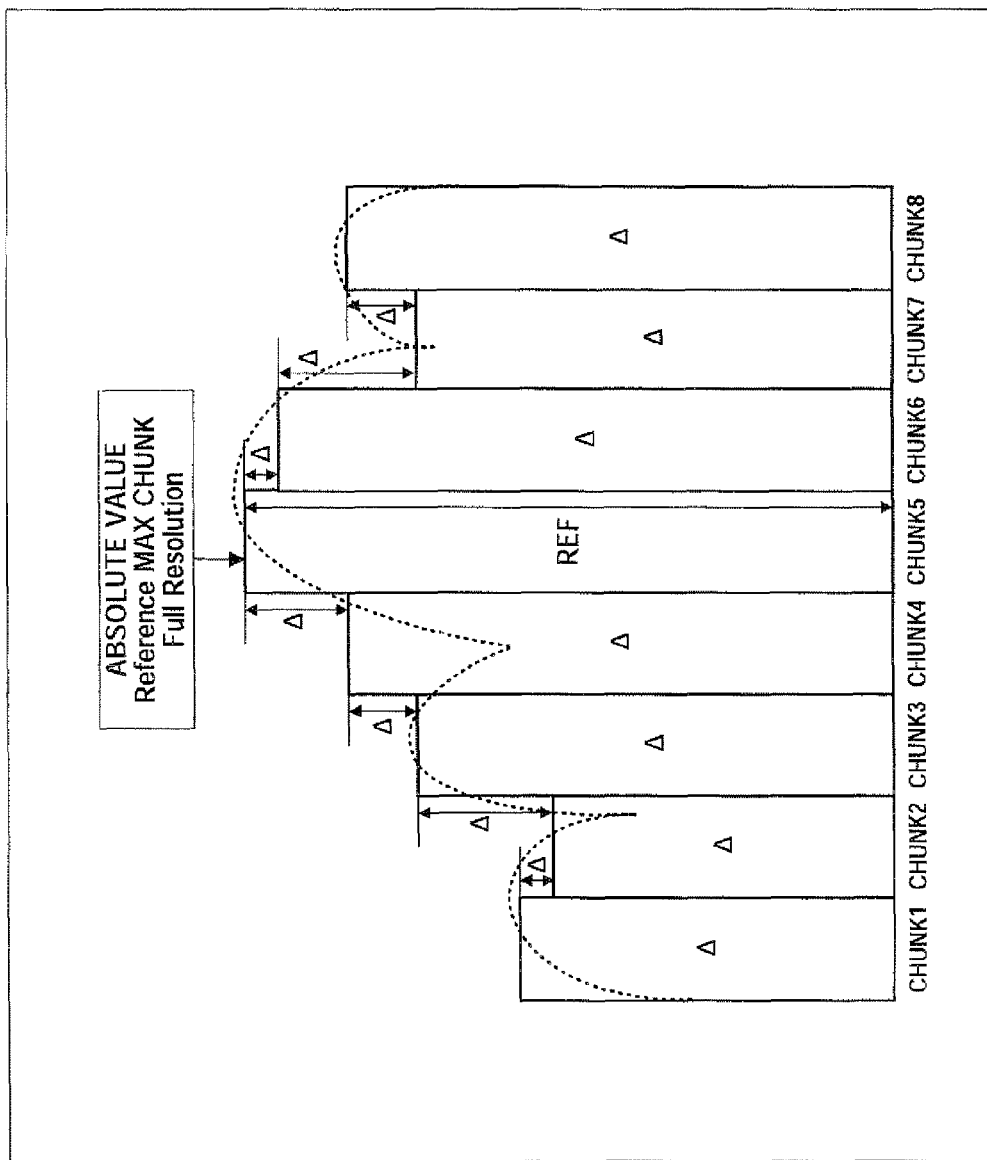
FIG. 6 illustrates a method for generating feedback information of the mobile station apparatus in FIG. 4.

As a method of calculating relative values of MCS's for adjacent chunks, for example, as shown in FIG. 5, relative values of MCS's are calculated by changing chunks used as the reference for calculating relative values, sequentially toward the reference chunk in the frequency domain. To describe the method in more detail with reference to FIG. 6, chunk 5 having the highest received signal level is determined as the reference chunk in this figure. Therefore, relative values for chunks 1 to 4 having lower frequencies than chunk 5 which is the reference chunk, are sequentially calculated in such a manner that the relative value of the MOS for chunk 4 (a negative value in this figure) is calculated using chunk 5 as a reference, and the relative value of the MCS for chunk 3 is calculated using chunk 4 as a reference. Further, relative values for chunks 6 to 8 having higher frequencies than chunk 5 which is the reference chunk, are sequentially calculated in such a manner that the relative value of the MCS for chunk 6 is calculated using chunk 5 as a reference, and the relative value of the MCS for chunk 7 is calculated using chunk 6 as a reference.

CQI information generating section 155 generates CQI using the relative values for the adjacent chunks calculated at relative value calculating section 150, the absolute value of the MCS for the reference chunk, and reference chunk information from reference chunk determining section 140.

Figure 7:
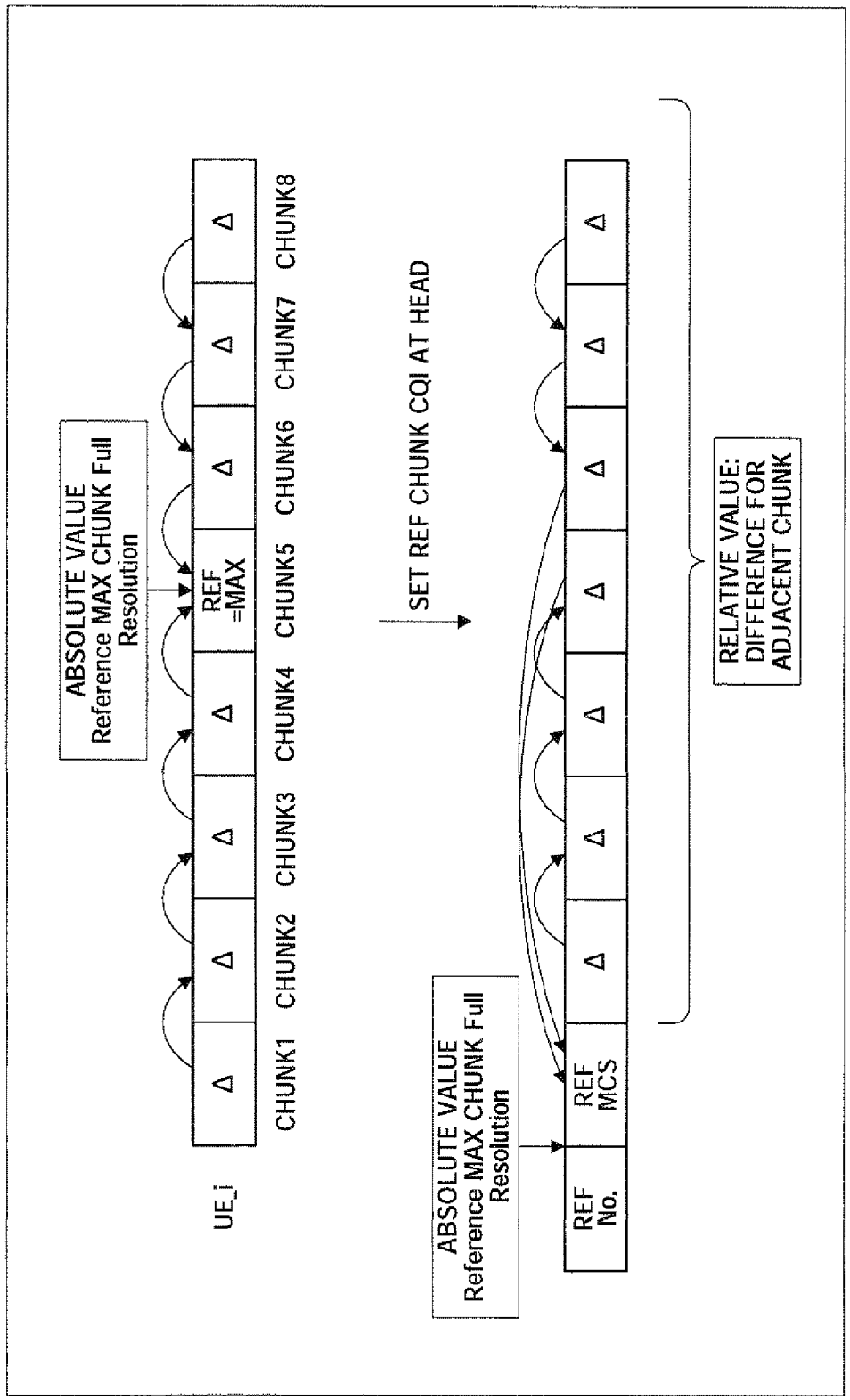
FIG. 7 illustrates a method for generating feedback information of the mobile station apparatus in FIG. 4.

CQI information is generated as shown in FIG. 7. That is, CQI information generating section 155 arranges the number of the reference chunk and the absolute value of the MCS for the reference chunk at the head of a data stream, and, after that, sequentially arranges the calculated relative values of MCS's for adjacent chunks in the frequency domain in one direction from a chunk at an edge in the frequency domain, that is, from the chunk having the highest frequency or the chunk having the lowest frequency, and generates CQI information.

Control information transmission controlling section 160 controls transmission of the CQI information generated at CQI information generating section 155 to base station apparatus 200 (described later).

The CQI information outputted from control information transmission controlling section 160 is subjected to error correction coding at error correction coding section 165, modulated at modulating section 170, and subjected to IFFT at IFFT section 175, and transmitted to base station apparatus 200 (described later) via RF transmitting section 185 after guard intervals are inserted at GI inserting section 180.

Demodulating section 120 receives as input the received signal subjected to FFT processing, demodulates the signal according to radio resource allocation information and outputs the demodulated received signal to error correction decoding section 125.

Error correction decoding section 125 receives as input the demodulated received signal, performs error correction decoding according to the radio resource allocation information and outputs the error-correction decoded signal to demultiplexing section 130.

Demultiplexing section 130 receives as input the error-correction decoded signal, demultiplexes the signal into various information such as received data, radio resource allocation information and CQI information, and outputs the radio resource allocation information to demodulating section 120 and error correction decoding section 125.

Figure 8:
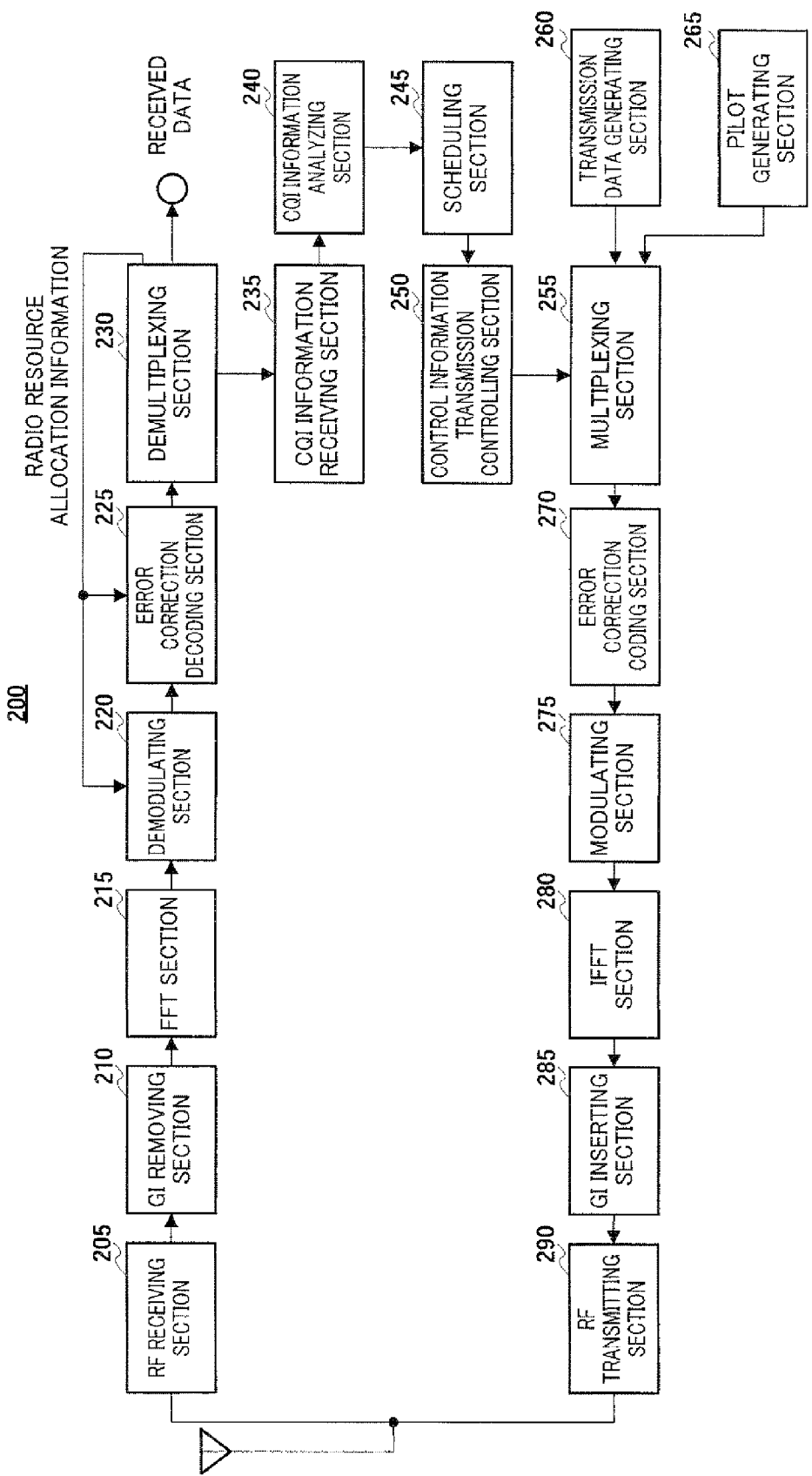
FIG. 8 is a block diagram showing a configuration of a base station apparatus according to Embodiment 1.

As shown in FIG. 8, base station apparatus 200 of Embodiment 1 has RE receiving section 205, GI removing section 210, FET section 215, demodulating section, 220, error correction decoding section 225, demultiplexing section 230, CQI information receiving section 235, CQI information analyzing section 240, scheduling section 245, control information transmission controlling section 250, multiplexing section 255, transmission data generating section 260, pilot generating section 265, error correction coding section 270, modulating section 275, IFFT section 280, G1 inserting section 285 and RF transmitting section 290.

RE receiving section 205 receives a signal transmitted from mobile station apparatus 100 and performs RE processing such as down-conversion.

GI removing section 210 removes guard intervals from the received signal subjected to RE processing and outputs the result to FFT section 215.

FFT section 215 receives from GI removing section 210 as input the received signal from which the guard intervals are removed, and performs FFT processing on this input signal. FFT section 215 outputs the received signal subjected to FFT processing to demodulating section 220.

Demodulating section 220 receives as input the received signal subjected to FFT processing, demodulates the signal according to the radio resource allocation information, and outputs the demodulated received signal to error correction decoding section 225.

Error correction decoding section 225 receives as input the demodulated received signal, performs error correction decoding according to the radio resource allocation information, and outputs the error-correction decoded signal to demultiplexing section 230.

Demultiplexing section 230 receives as input the error-correction decoded signal, demultipiexes the signal into various information such as received data, radio resource allocation information and CQI information, outputs the radio resource allocation information to demodulating section 220 and error correction decoding section 225, and outputs the CQI information to CQI information receiving section 235.

The outputted CQI information is outputted to CQI information analyzing section 240 via CQI information receiving section 235.

CQI information has the structure described above, that is, the structure where the number of the reference chunk and the absolute value of the MCS for the reference chunk are arranged at the head of a data stream, and after that, the calculated relative values of MCS's for adjacent chunks are sequentially arranged in the frequency domain in one direction toward the reference chunk from a chunk at an edge in the frequency domain, that is, from the chunk having the highest frequency or the chunk having the lowest frequency. Therefore, CQI information analyzing section 240 calculates absolute values of MCS's for all chunks based on this CQI information. The absolute values of MCS's for the chunks are outputted to scheduling section 245.

Scheduling section 245 performs scheduling based on the absolute values of MCS's for the chunks, and outputs the scheduling information to control information transmission controlling section 250. The scheduling information is outputted to multiplexing section 255 according to control of control information transmission controlling section 250.

Multiplexing section 255 receives as input and multiplexes transmission data from transmission data generating section 260, the pilot signal from pilot generating section 265 and the scheduling information from control information transmission controlling section 250. The multiplexed signal is subjected to error correction coding at error correction coding section 270, modulated at modulating section 275, subjected to IFFT at IFFT section 280, and transmitted to mobile station apparatus 100 via RF transmitting section 290 after guard intervals are inserted at GI inserting section 285.

Figure 9:
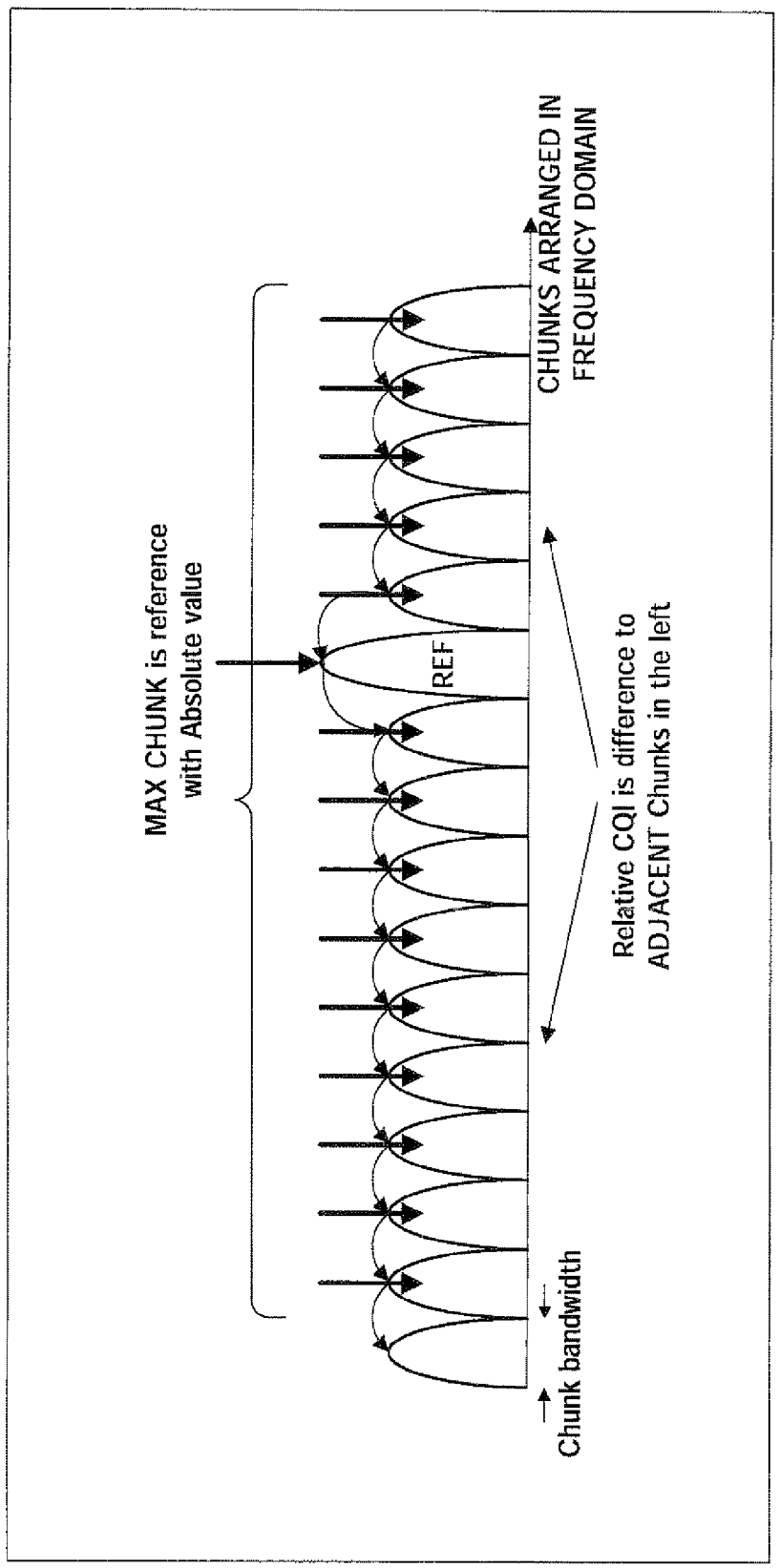
FIG. 9 illustrates another method for generating feedback information of the mobile station apparatus in FIG. 4.
Figure 10:
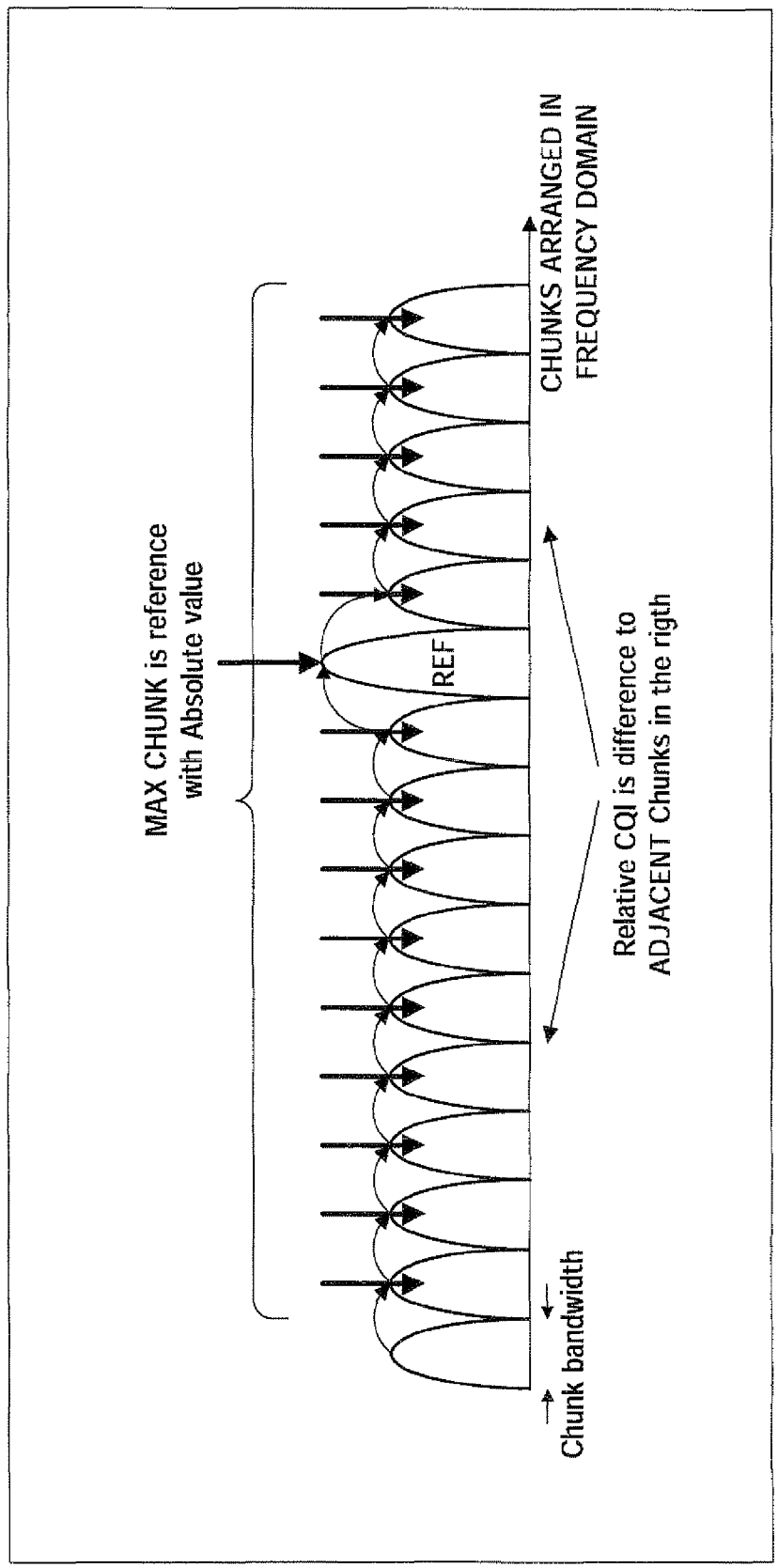
FIG. 10 illustrates still another method for generating feedback information of the mobile station apparatus in FIG. 4.

In addition, a method has been described with the above description where relative values of MCS's for adjacent chunks are calculated by sequentially changing the reference from the reference chunk, but this is by no means limiting, and it is also possible to calculate relative values of MCS's in one direction from a chunk having a lower frequency toward a chunk having a higher frequency as shown in FIG. 9, or calculate relative values of MCS's in one direction from a chunk having a higher frequency toward a chunk having a lower frequency.

Further, a case has been described with the above description where the MCS for each chunk is determined from the received signal level measured at mobile station apparatus 100 and CQI information is generated from the absolute value of the reference chunk and relative values of MCS's for adjacent chunks. However, the present invention is not limited to this, and it is also possible to use the measured received signal level as CQI information without determining MCS's at mobile station apparatus 100. That is, mobile station apparatus 100 may generate CQI information using the absolute value of the received signal level (for example, SINR) of the reference chunk and relative values of the received signal levels for adjacent chunks, and base station apparatus 200, which is a CQI information receiving side, may determine MCS's using the received CQI information and perform scheduling.

In this way, according to Embodiment 1, mobile station apparatus 100 that performs multicarrier communication with base station apparatus 200, has: received signal level measuring section 135 that measures communication quality (for example, SINR as the received level) of each chunk comprised of a plurality of subcarriers based on a known signal (a pilot signal from base station apparatus 200); control information transmission controlling section 160 that transmits feedback information (CQI information) based on the communication quality of each chunk to base station apparatus 200; relative value calculating section 150 that calculates relative values of communication quality for adjacent chunks (for example, relative values of SINR or relative values of MCS corresponding to SINR) from the communication quality of each chunk (for example, SINR as the received signal level); and CQI information generating section 155 that generates feedback information (CQI information) from the absolute value of the reference chunk (for example, the absolute value of SINR, the absolute value of an MCS corresponding to SINR) and the relative values of communication quality for adjacent chunks (for example, relative values of SINR or relative values of MCS's corresponding to SINR).

Figure 11:
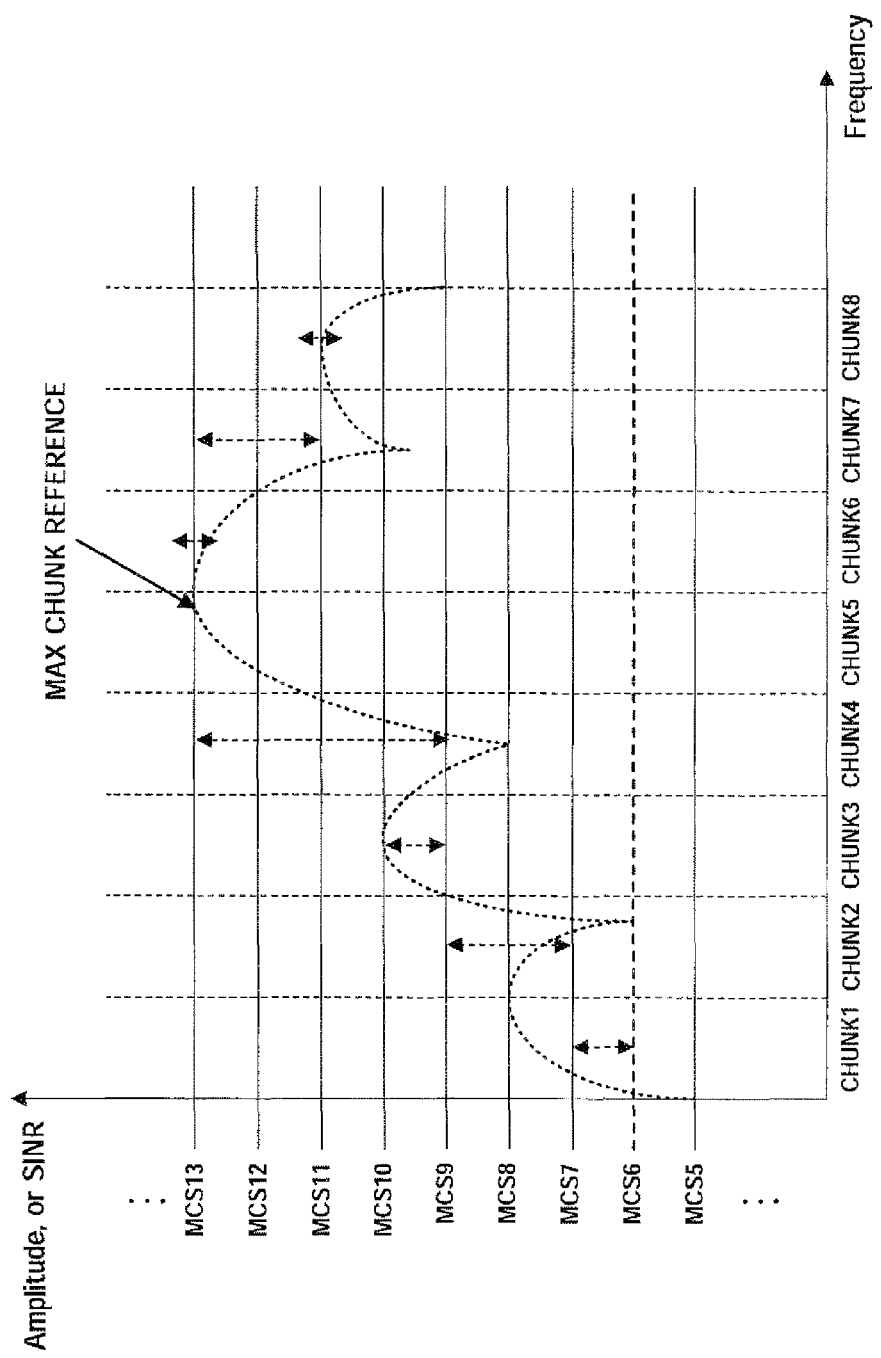
FIG. 11 illustrates a method for generating feedback information of the mobile station apparatus in FIG. 4.

By this means, feedback information is generated from the relative values of communication quality for adjacent chunks, so that, for example, even in a state where communication quality substantially fluctuates as shown in FIG. 11, it is possible to generate feedback information reflecting the fluctuation state of communication quality without increasing the amount of information for showing communication quality, reduce the data amount for feedback and improve the accuracy of feedback information. As a result, at base station apparatus 200 that receives feedback information, scheduling and the like is performed based on accurate feedback information, so that it is possible to improve communication quality of mobile station apparatus 100 and base station apparatus 200. Further, by using the relative values of communication quality for adjacent chunks, it is possible to cover a range of substantial change of CQI with the same number of bits and represent communication quality in a range where communication quality is greatly different from communication quality of the reference chunk.

Further, mobile station apparatus 100 has reference chunk determining section 140 that selects the chunk having the best communication quality (for example, SINR as the received signal level) as the reference chunk.

By this means, it is possible to select a chunk having the most reliable communication quality. By transmitting feedback information including the absolute value of communication quality of this reference chunk to base station apparatus 200, the reliability of absolute values of communication quality for each chunk which are calculated by converting feedback information at base station apparatus 200 increases, so that it is possible to improve communication quality of mobile station apparatus 100 and base station apparatus 200.

Further, mobile station apparatus 100 has MCS determining section 145 that determines an MCS for each chunk based on communication quality of each chunk measured at received level measuring section 135. Relative value calculating section 150 calculates relative values of MCS's for adjacent chunks, and CQI information generating section 155 generates CQI information from the absolute value of the MCS for the reference chunk and the relative values of MCS's for adjacent chunks.

Embodiment 2

In embodiment 1, relative values of MCS's are always reported per MCS. By contrast with this, in Embodiment 2, the report granularity for reporting relative values of MCS's (step size) is changed according to channel state between the base station apparatus (Node-B) and the mobile station apparatus (UE).

Figure 12:
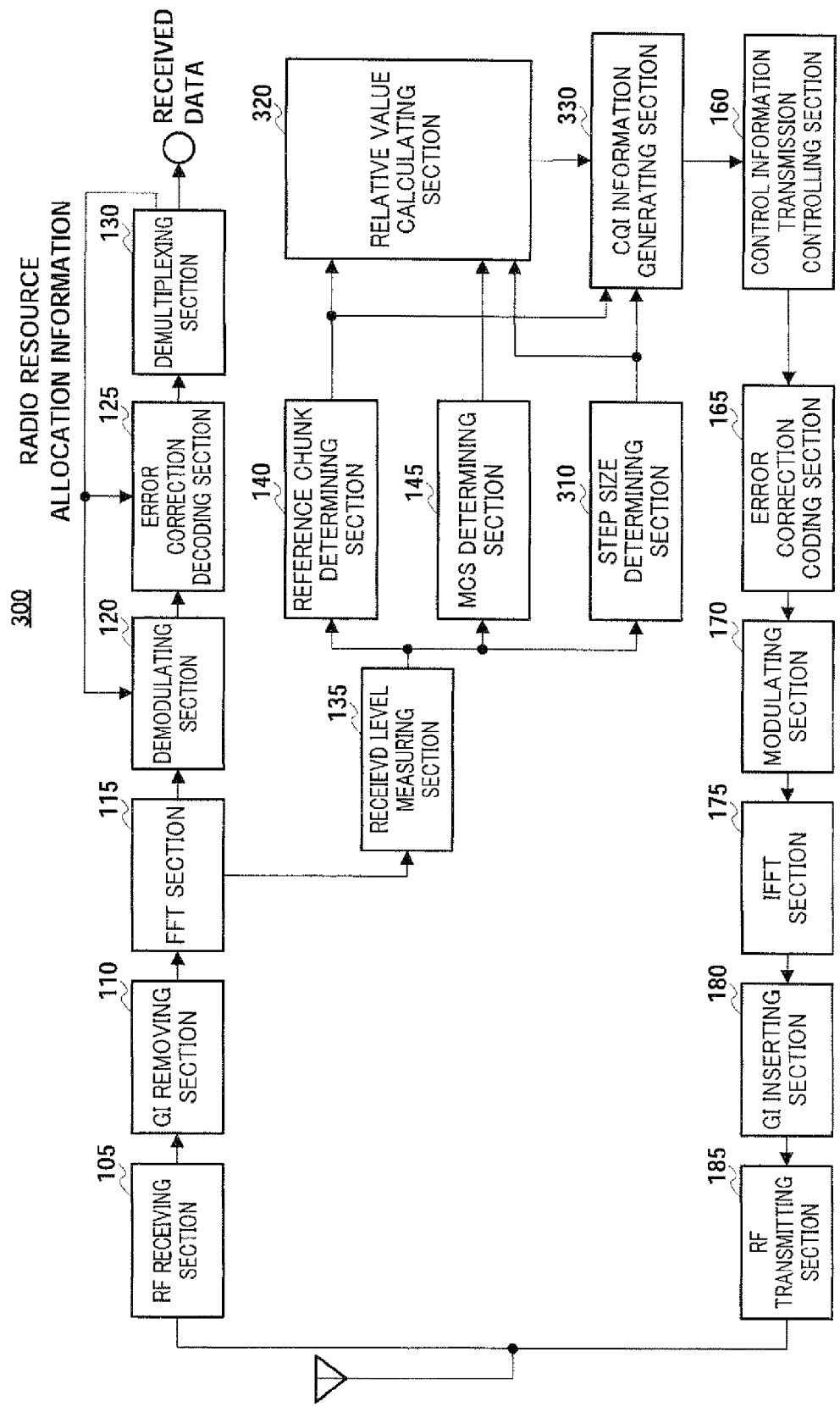
FIG. 12 is a block diagram showing a configuration of a mobile station apparatus according to Embodiment 2.

As shown in FIG. 12, mobile station apparatus 300 of Embodiment 2 has step size determining section 310, relative value calculating section 320 and CQI information generating section 330.

Step size determining section 310 estimates a channel state between mobile station apparatus 300 and base station apparatus 400 (described later) based on the received signal level measured at received level measuring section 135 and determines the report granularity for reporting relative values of MCS's (step size) according to this channel state. This step size information is outputted to relative value calculating section 320.

Relative value calculating section 320 calculates CQI information based on the step size information determined at step size determining section 310, the reference chunk determined at reference chunk determining section 140 and the MCS of each chunk determined at MCS determining section 145.

Figure 13:
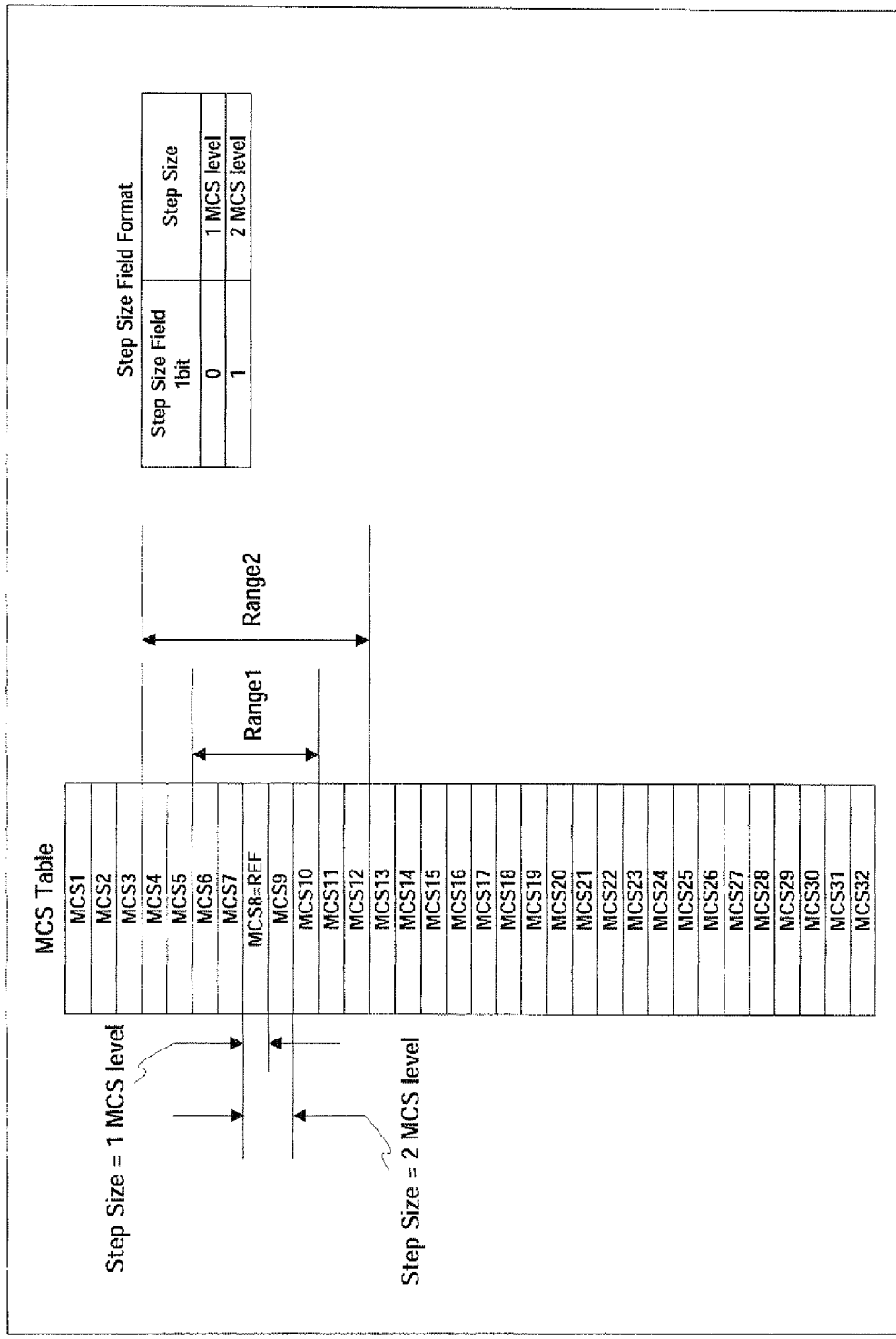
FIG. 13 illustrates change of a step size of the mobile station apparatus in FIG. 12.

To be more specific, first, relative value calculating section 320 temporarily stores the absolute value of the MCS for the reference chunk and calculates and temporarily stores the relative values of MCS's for adjacent chunks for other chunks. Relative value calculating section 320 converts the calculated relative values of MCS's for adjacent chunks based on the step size information. For example, in FIG. 13, when the step size is 1 MCS, MCS 8 is the MCS for the reference chunk, and MCS's for adjacent chunks are MCS 7 and MCS 6, relative values become 1 and 2, respectively. When the step size is 2 MOS's, relative values become both 1, and the values become converted relative values of MCS's for adjacent chunks. In this way, by increasing the step size, even when the number of bits used for showing relative values of MCS's is limited, it is possible to follow substantial fluctuation of the relative values.

Figure 14:
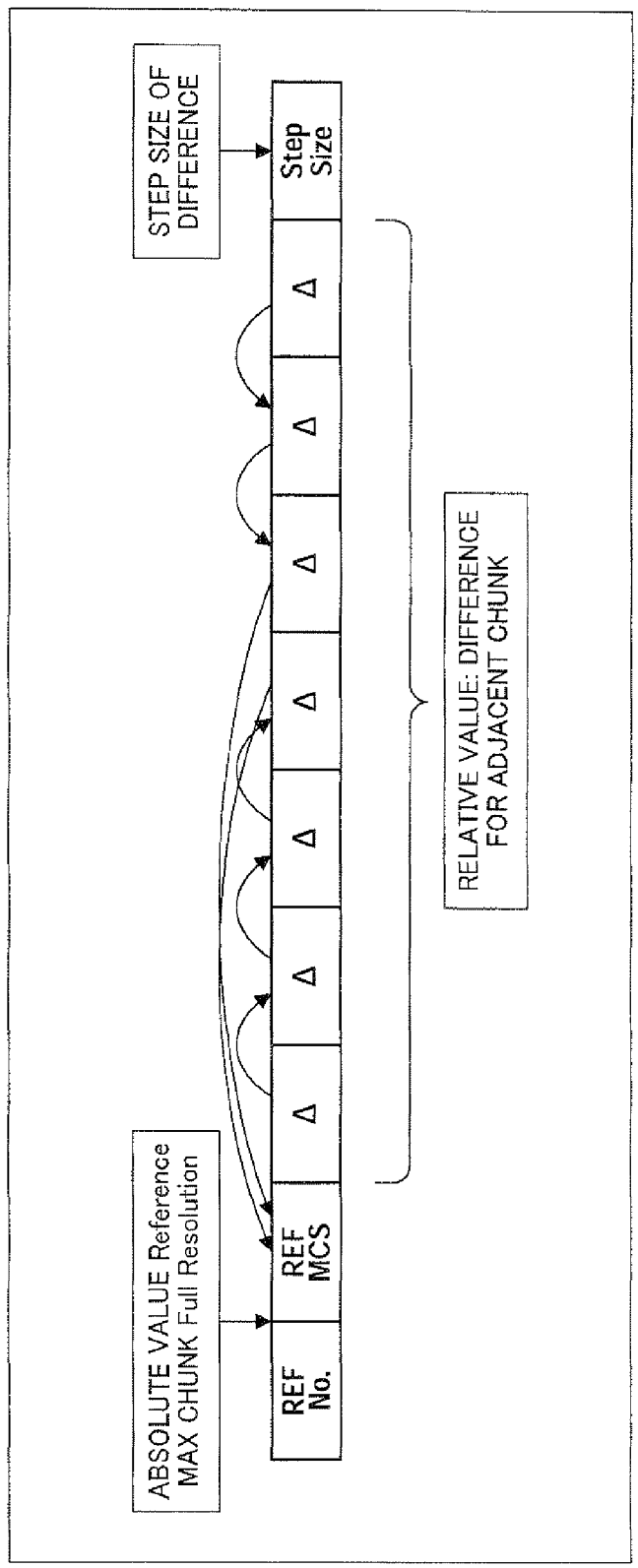
FIG. 14 shows an example of a structure of CQI information according to Embodiment 2.

CQI information generating section 330 generates CQI information using the relative values of MCS's for adjacent chunks calculated at relative value calculating section 320, the absolute value of the MCS for the reference chunk, the reference chunk information from reference chunk determining section 140 and the step size information from step size determining section 310. To be more specific, a data structure is such that the step size information is included in the CQI information shown in FIG. 7 (refer to FIG. 14).

Figure 15:
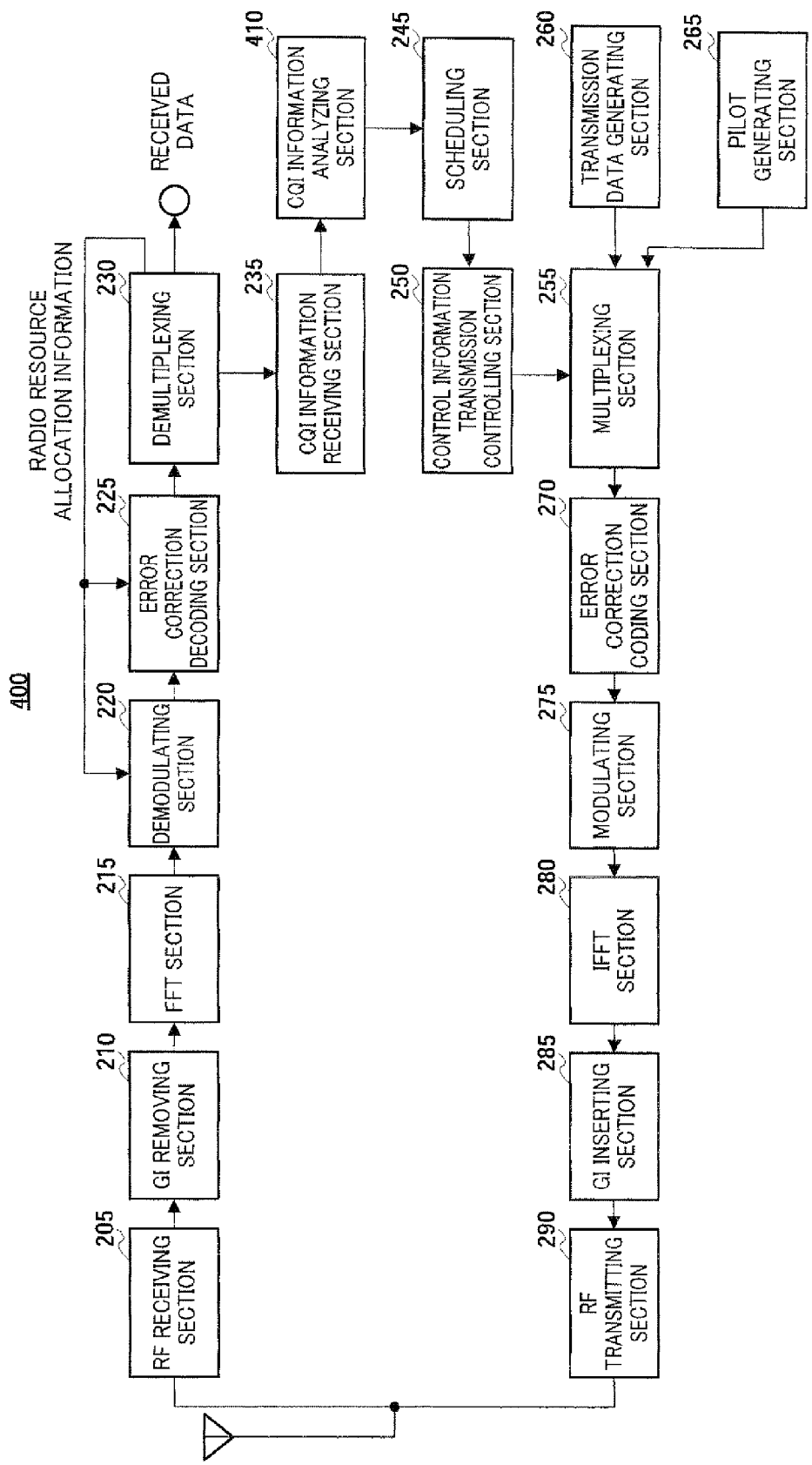
FIG. 15 is a block diagram showing a configuration of a base station apparatus according to Embodiment 2.

As shown in FIG. 15, base station apparatus 400 of Embodiment 2 has CQI information analyzing section 410. The CQI information adopts the structure described above, that is, the data structure (FIG. 14) where the step size information is included in the CQI information shown in FIG. 7, and CQI information analyzing section 410 calculates absolute values of MCS's for all chunks based on this CQI information. To be more specific, the converted relative values are inversely converted relative values before conversion based on the step size information, and absolute values of MCS's for all chunks are calculated from the relative values before conversion and the absolute value of the MCS for the reference chunk. The absolute value of the MCS for each chunk is outputted to scheduling section 245.

In this way, according to Embodiment 2, mobile station apparatus 300 that performs multicarrier communication with base station apparatus 400, has: received level measuring section 135 that measures communication quality (for example, SINR as the received level) of each chunk comprised of a plurality of subcarriers based on a known signal (pilot signal from base station apparatus 400); control information transmission controlling section 160 that transmits feedback information (CQI information) based on communication quality of each chunk to base station apparatus 400; relative value calculating section 320 that calculates relative values of communication quality for adjacent chunks (for example, relative values of SINR or relative values of MCS's corresponding to SINR) from the communication quality of each chunk (for example, SINR as the received level); and CQI information generating section 330 that generates feedback information (CQI information) from the absolute value of communication quality of the reference chunk (for example, the absolute value of SINR and the absolute value, of MCS corresponding to SINR) and the relative values of communication quality for the adjacent chunks (for example, relative values of SINR or relative values of MCS's corresponding to SINR).

Further, mobile station apparatus 300 has step size determining section 310 that determines a report granularity (step size) for reporting the relative values of communication quality (for example, relative values of SINR or relative values of MCS's corresponding to SINR) based on the measured communication quality (for example, SINR as the received level). Relative value calculating section 320 calculates converted relative values obtained by converting the relative values of communication quality according to the report granularity for reporting, and CQI information generating section 330 generates the feedback information from the absolute value of communication quality of the reference chunk (for example, the absolute value of SINR and the absolute value of MCS corresponding to SINR), the converted relative values (for example, converted relative values of SINR or converted relative values of MCS corresponding to SINR) and the report granularity for reporting.

By this means, the report granularity for reporting can be changed adaptively according to communication quality, so that, even in a communication state where communication quality fluctuates substantially, it is possible to generate feedback information accurately reflecting fluctuation state of communication quality without increasing the amount of information for showing communication quality, reduce the data amount for feedback and improve the accuracy of feedback information. As a result, at base station apparatus 400 that receives feedback information, scheduling or the like can be performed based on accurate feedback information, so that it is possible to improve communication quality of mobile station apparatus 300 and base station apparatus 400.

Embodiment 3

In Embodiment 1, relative values of MCS's are always reported per MCS. By contrast with this, in Embodiment 3, the report granularity (step size) for reporting relative values of MCS's is determined based on the MCS's determined from the received level of each chunk of a pilot signal transmitted from the base station apparatus (Node-B).

Figure 16:
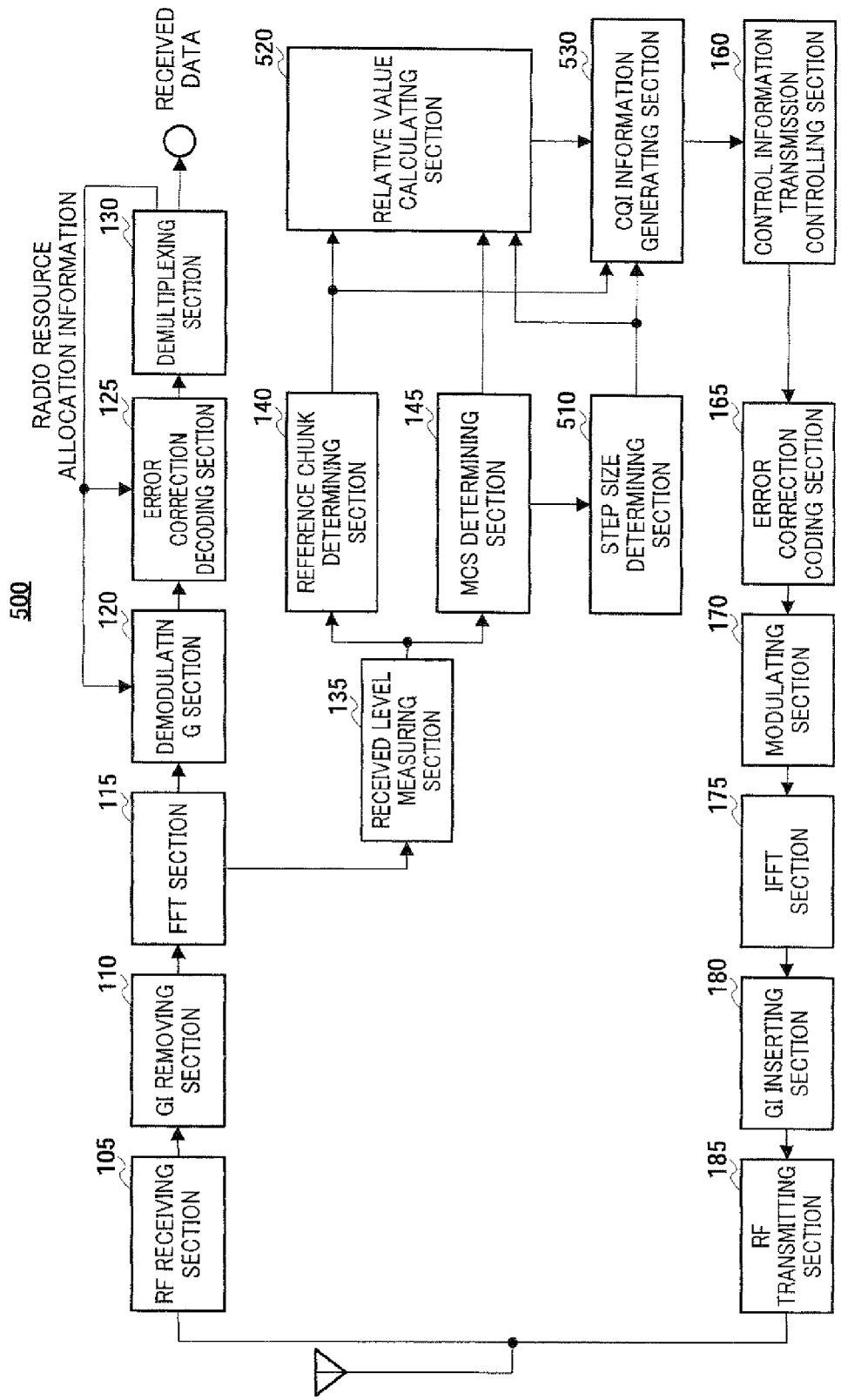
FIG. 16 is a block diagram showing a configuration of a mobile station apparatus according to Embodiment 3.

As shown in FIG. 16, mobile station apparatus 500 of Embodiment 3 has step size determining section 510, relative value calculating section 520 and CQI information generating section 530.

Step size determining section 510 determines the report granularity (step size) for reporting relative values of MCS's based on the MCS of each chunk determined at MOS determining section 145.

Figure 17:
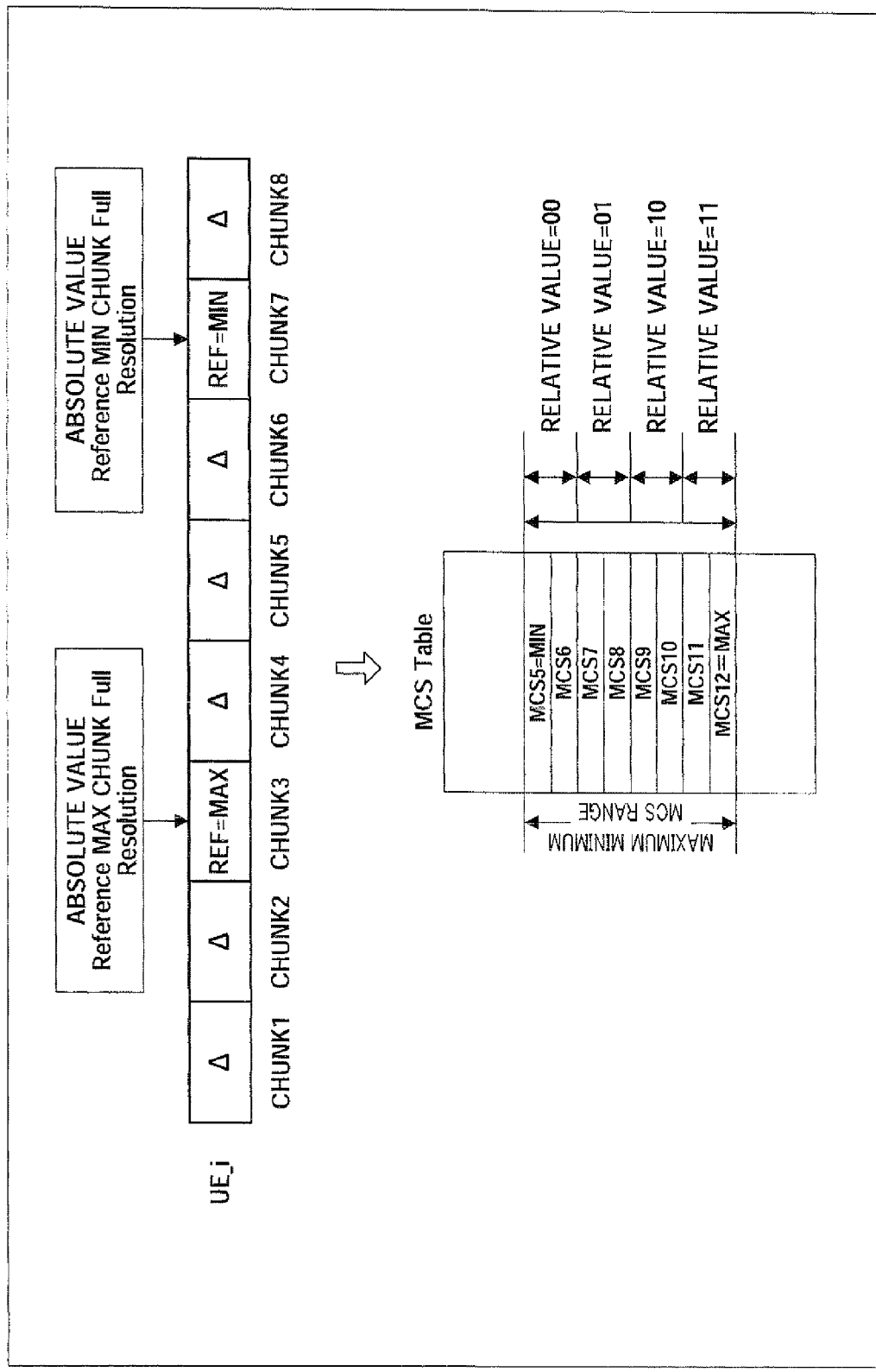
FIG. 17 illustrates change of a step size of the mobile station apparatus in FIG. 16.

To be more specific, as shown in FIG. 17, step size determining section 510 specifies the chunk having the maximum MCS and the chunk having the minimum MCS from the MCS of each chunk determined at MCS determining section 145. Mobile station apparatus 500 reports absolute values of the chunk having the maximum MCS and the chunk having the minimum MCS to base station apparatus 600 (described later) as reference chunks. A difference between the maximum chunk and the minimum chunk (range between the maximum MOS and the minimum MCS) is divided into the number of ranges that can be represented with the number of bits prepared for showing correlation values of MCS's for adjacent chunks. The divided range provides the step size in this embodiment. That is, step size determining section 510 divides the range between the maximum MCS and the minimum MCS into the number of ranges that can be represented with the number of bits prepared for showing the correlation values of MCS's for adjacent chunks to calculate the step size. In this figure, the number of bits prepared for showing the correlation values of MCS's for adjacent chunks is two, the number of ranges that can be shown is four, the maximum minimum MCS range is 8, and therefore the step size becomes 2 MCS's. Here, although a case is described where the step sizes are made uniform, this is by no means limiting, and the range may be ununiformly divided. Particularly, by increasing the number of divided ranges for the range where the received level is high, that is, the MCS level is high, and by decreasing the number of divided ranges for the range where the received level is low, the range where the reliability of the measured value of the received level is higher can be represented accurately, so that it is possible to improve the accuracy of CQI information.

Relative value calculating section 520 calculates CQI information based on step size information determined at step size determining section 510, the reference chunk determined at reference chunk determining section 140 and the MCS of each chunk determined at MCS determining section 145.

To be more specific, first, relative value calculating section 520 temporarily stores the absolute value of the MCS with respect to the reference chunk, and calculates and temporarily stores relative values of MCS's for adjacent chunks with respect to other chunks. Relative value calculating section 520 converts the calculated relative values of MCS's for adjacent chunks based on the step size information.

CQI information generating section 530 generates CQI information using the relative values of MCS's for adjacent chunks calculated at relative value calculating section 520, the absolute value of the MCS for the reference chunk, the reference chunk information from reference chunk determining section 140 and the step size information from step size determining section 510. To be more specific, a data structure (FIG. 14) is such that step size information is included in the CQI information shown in FIG. 7.

Figure 18:
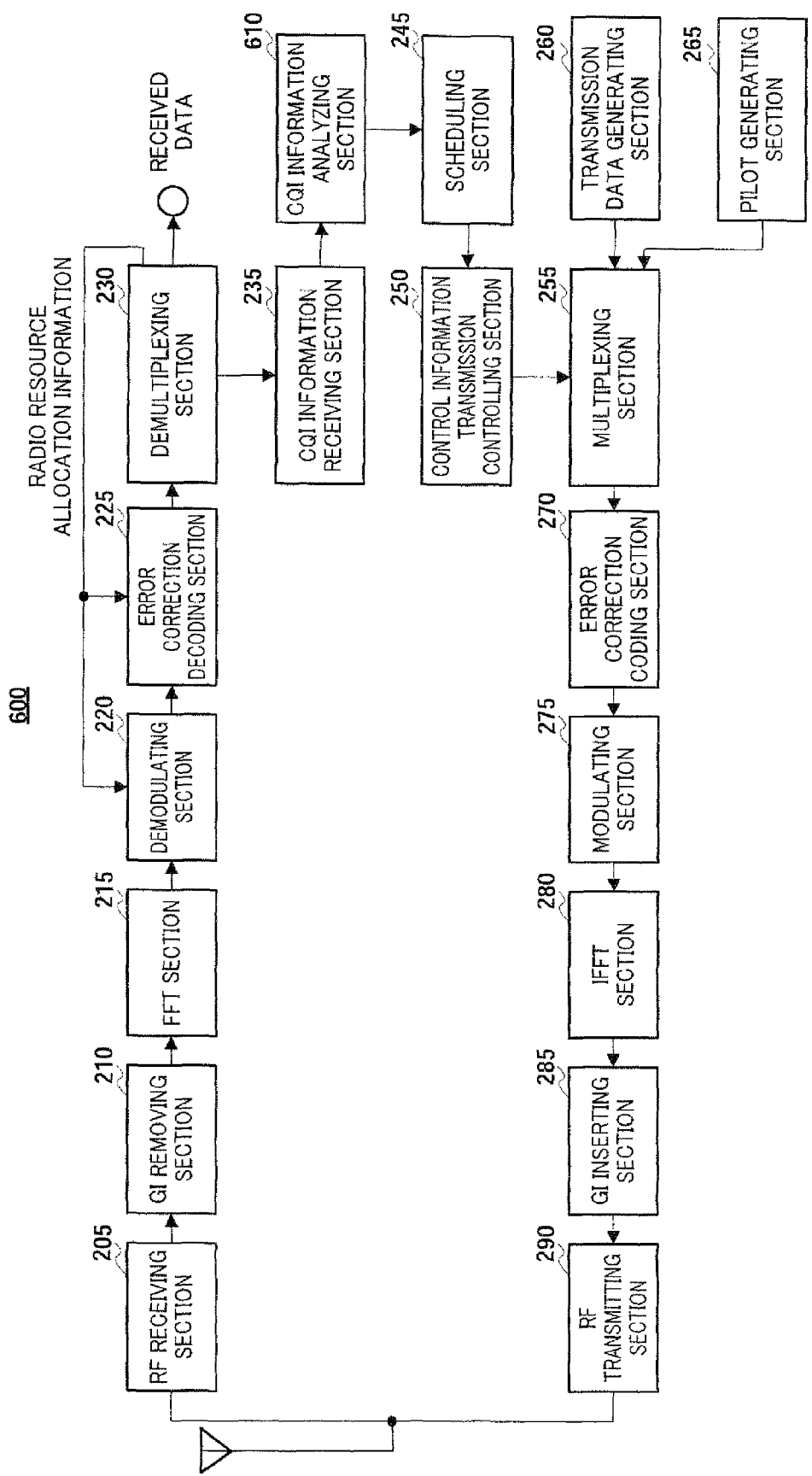
FIG. 18 is a block diagram showing a configuration of a base station apparatus according to Embodiment 3.

As shown in FIG. 18, base station apparatus 600 of Embodiment 3 has CQI information analyzing section 610. The CQI information adopts the structure as described above, that is, the data structure where the step size information is included in the CQI information shown in FIG. 7, and so CQI information analyzing section 610 calculates absolute values of MCS's for all chunks based on this CQI information. To be more specific, the converted relative values are inversely converted, to relative values before conversion, based on step size information, and the absolute values of MCS's for all chunks are calculated from the relative values before conversion and the absolute value of the MCS for the reference chunk. The absolute value of the MCS for each chunk is outputted to scheduling section 245.

In this way, according to Embodiment 3, mobile station apparatus 500 that performs multicarrier communication with base station apparatus 600 has: received level measuring section 135 that measures communication quality (for example, SINR as the received level) of each chunk comprised of a plurality of subcarriers based on a known signal (a pilot signal from base station apparatus 600); control information transmission controlling section 160 that transmits feedback information (CQI information) based on the communication quality of each channel to base station apparatus 600; relative value calculating section 520 that calculates relative values of communication quality for adjacent chunks (for example, relative values of SINR or relative values of MCS's corresponding to SINR) from communication quality of each chunk; CQI information generating sec on 530 that generates feedback information (CQI information) from the absolute value of communication quality for the reference chunk (for example, the absolute value of SINR or the absolute value of MCS corresponding to SINR) and the relative values of communication quality for adjacent chunks (for example, relative values of SINR or relative values of MCS's corresponding to SINR).

Further, mobile station apparatus 500 has MCS determining section 145 that determines the MCS of each chunk based on measured communication quality of each chunk (for example, SINR as the received level); and step size determining section 510 that determines the report granularity (step size) for reporting relative values of communication quality (for example, relative values of MCS corresponding to SINR) based on the width between the maximum MCS and the minimum MCS out of MCS's determined at MCS determining section 145 and the number of bits for showing relative values of communication quality for adjacent chunks in feedback information. Relative value calculating section 520 calculates converted relative values obtained by converting the relative values of communication quality according to the report granularity for reporting, and CQI information generating section 530 generates the feedback information from the absolute value of communication quality for the reference chunk (for example, the absolute value of MCS corresponding to SINR), the converted relative values (for example, converted relative values of MCS's corresponding to SINR) and the report granularity for reporting.

By this means, a report granularity for reporting can be adaptively changed according to the communication quality, so that, even in a communication state where communication quality fluctuates substantially, it is possible to generate feedback information accurately reflecting fluctuation state of communication quality without increasing the amount of information for showing communication quality, reduce the data amount for feedback and improve the accuracy of feedback information. As a result, at base station apparatus 600 that receives feedback information, scheduling or the like can be performed based on accurate feedback information, so that it is possible to improve communication quality of mobile station apparatus 500 and base station apparatus 600.

Other Embodiments

In Embodiments 1 to 3, a case has been described where the chunk having the best communication quality is selected as the reference chunk, but this is by no means limiting, and, for example, it is also possible to determine a chunk having an MCS close to an average value of MCS's for all chunks as a reference chunk. Further, it is possible to select a reference chunk randomly or select a reference chunk according to fixed patterns. Furthermore, the base station may specify different patterns for reporting the reference chunk to the mobile stations.

INDUSTRIAL APPLICABILITY

The mobile station apparatus of the present invention performs multicarrier communication such as OFDM communication with the base station apparatus and is suitable for use as a mobile station apparatus that reduces the data amount for feedback and improves communication quality without decreasing the accuracy of feedback information.

The invention claimed is:

1. A mobile station apparatus comprising:
a calculating unit configured to calculate a channel quality indicator (CQI) value for each of groups, into which subcarriers that are consecutive in a frequency domain are divided in a predefined unit of a time domain, the CQI value representing channel quality according to a first step size, by which a range of the CQI value is divided;
a generating unit configured to generate feedback information based on the calculated CQI value for each of the groups; and
a transmitting unit configured to transmit the feedback information, wherein:
said calculating unit calculates a differential value for each of the groups, the differential value being a difference of the calculated CQI value with respect to a single CQI value which represents channel quality for all of the groups, and transforms the differential value according to a second step size, which includes a step size greater than the first step size and by which a range of the difference is divided, and
said generating unit generates the feedback information forming a data sequence, in which the single CQI value is positioned at the beginning and the differential values for the groups are positioned after the single CQI value in order of increasing frequency or decreasing frequency.

2. The mobile station apparatus according to claim 1, wherein said transmitting unit transmits the single CQI value which represents the channel quality for all of the groups as an absolute value.

3. The mobile station apparatus according to claim 1, further comprising a receiving unit configured to receive transmission data, which is transmitted using said groups.

4. The mobile station apparatus according to claim 1, wherein the CQI value indicates a modulation and coding scheme (MCS).

5. A communication method comprising:
calculating a channel quality indicator (CQI) value for each of groups, into which subcarriers that are consecutive in a frequency domain are divided in a predefined unit of a time domain, the CQI value representing channel quality according to a first step size, by which a range of the CQI value is divided; and
generating feedback information based on the calculated CQI value, wherein:
a differential value for each of the groups is calculated, the differential value being a difference of the CQI value with respect to a single CQI value which represents channel quality for all of the groups, and the differential value is transformed according to a second step size, which includes a step size greater than the first step size and by which a range of the difference is divided, and
the feedback information forming a data sequence, in which the single CQI value is positioned at the beginning and the differential values for the groups are positioned after the single CQI value in order of increasing frequency or decreasing frequency.

* * * * *